United States Patent [19]

Penzhorn et al.

[11] Patent Number: 4,875,945
[45] Date of Patent: Oct. 24, 1989

[54] PROCESS FOR CLEANING THE EXHAUST GAS OF A FUSION REACTOR

[75] Inventors: Ralf-Dieter Penzhorn, Bruchsal, Fed. Rep. of Germany; Hiroshi Yoshida, Tokai, Japan

[73] Assignee: Kernforschungszentrum Karlsruhe GmbH, Fed. Rep. of Germany

[21] Appl. No.: 246,233

[22] Filed: Sep. 19, 1988

[30] Foreign Application Priority Data

Sep. 18, 1987 [DE] Fed. Rep. of Germany ....... 3731385

[51] Int. Cl.$^4$ ............................................. G21B 1/00
[52] U.S. Cl. .................................... 376/146; 376/314; 376/324; 376/325; 55/16; 423/237; 423/247; 423/248
[58] Field of Search ............... 376/146, 310, 314, 324, 376/325; 55/16; 423/237, 247, 248, 210

[56] References Cited

U.S. PATENT DOCUMENTS

| | | | |
|---|---|---|---|
| 4,067,702 | 1/1978 | Hickman | 376/146 |
| 4,673,547 | 6/1987 | Iniotakis et al. | 376/314 |
| 4,774,065 | 9/1988 | Penzhorn | 376/146 |

FOREIGN PATENT DOCUMENTS

| | | |
|---|---|---|
| 3606316 | 9/1987 | Fed. Rep. of Germany . |
| 3606317 | 9/1987 | Fed. Rep. of Germany . |

OTHER PUBLICATIONS

Kerr et al., "Fuel Cleanup System for the Tritium Systems Test Assembly: Design and Experiments", *Proceedings of Tritium Technology in Fission, Fusion and Isotopic Application*, Dayton, Ohio, Apr. 29, 1980, pp. 115 to 118.
Dinner et al., "Tritium System Concepts for the Next European Torus Project", Fusion Technology, vol. 8, No. 2, Part 2, pp. 2228 to 2235.
H. Yoshida et al., Nucl. Technology/Fusion 5, 178 (1984).

*Primary Examiner*—Harvey E. Behrend
*Attorney, Agent, or Firm*—Sughrue, Mion, Zinn, Macpeak & Seas

[57] ABSTRACT

The exhaust gas of a fusion reactor contains, besides non-burnt fuel (tritium and deuterium) and helium, the "ash" from the nuclear fusion reaction a number of impurities with the radioactive tritium and/or deuterium chemically bound to them. In order to clean the exhaust gas, both the elemental and the chemically bound tritium and/or deuterium fractions are separated from the exhaust gas. Separation is achieved exclusively by physical and catalytical process steps, namely a palladium/silver permeator, a $CuO/Cr_2O_3/ZnO$ catalyst bed and a further palladium/silver permeator containing a nickel/aluminum oxide bulk catalyst.

3 Claims, 1 Drawing Sheet

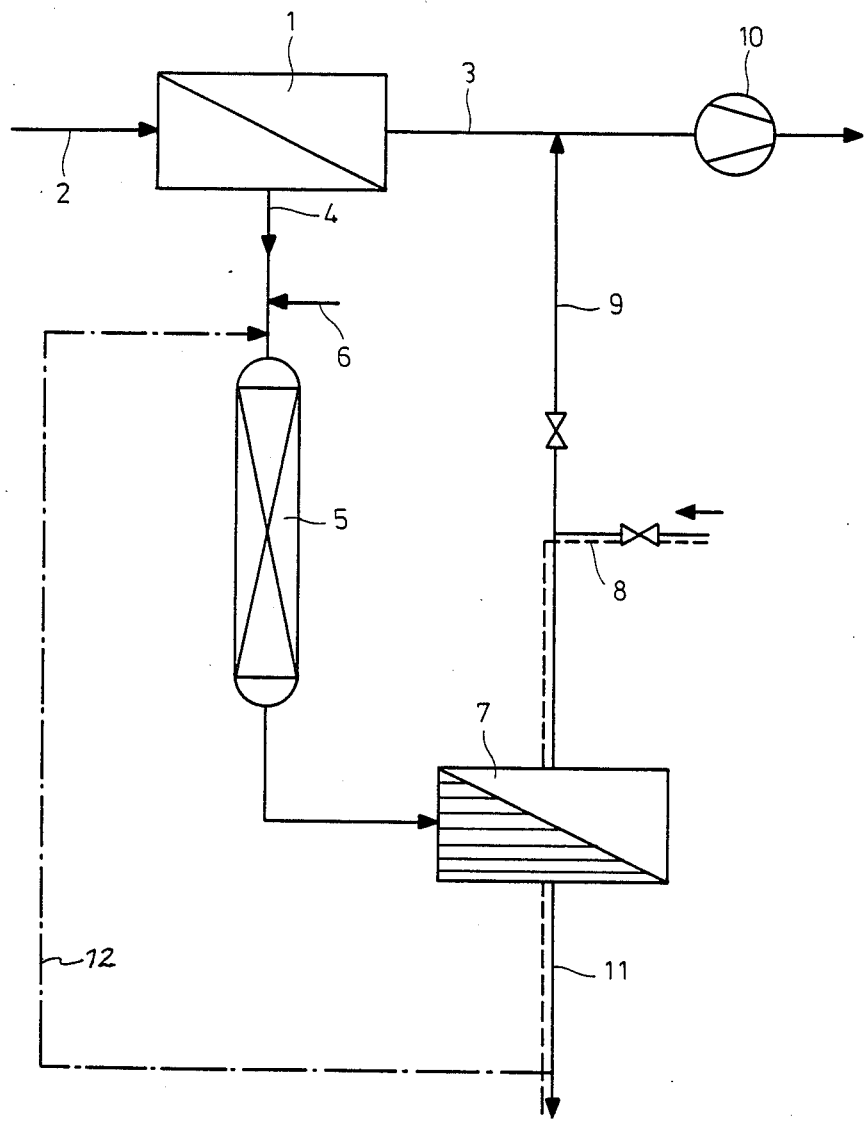

PROCESS FOR CLEANING THE EXHAUST GAS OF A FUSION REACTOR

BACKGROUND OF THE INVENTION

The present invention relates to a process for cleaning the exhaust gas from a fusion reactor of exhaust gas components containing heavy hydrogen, the heavy hydrogen exhaust gas components comprising tritium and/or deuterium in their elemental forms and impurities which contain tritium and/or deuterium in chemically bound form, wherein the tritium and/or deuterium is released from its chemically bound form, and the released tritium and/or deuterium and the elemental heavy hydrogen are separated from the exhaust gas and returned into the fuel cycle.

The exhaust gas from the fuel cycle of a fusion reactor consists essentially of non-reacted fuel, tritium and deuterium in their elemental forms and, in addition helium, the "ash" from nuclear fusion reaction, it contains quite a number of other impurities whose concentrations attain only a few percent and which, partly, contain heavy hydrogen chemically bound to them. The majority of these impurities are carbon monoxide and hydrocarbons, such as methane. In addition, ammonia, carbon dioxide and water vapor usually occur at lower concentrations in the exhaust gas.

On account of its content of elemental and chemically bound heavy hydrogen (tritium and deuterium), this exhaust gas cannot be stacked directly to the atmosphere because the heavy hydrogen (tritium and deuterium) fraction must be separated beforehand. It is furthermore desirable to recycle tritium and deuterium into the fusion process.

Various techniques have been proposed for cleaning the exhaust gas of a fusion reactor. Processes and an apparatus for decontaminating exhaust gas of tritium and/or deuterium have been suggested by Kerr et al, "Fuel Cleanup System for the Tritium Systems Test Assembly: Design and Experiments", *Proceedings of Tritium Technology in Fission, Fusion and Isotopic Application,* Dayton, Ohio, Apr. 29, 1980, at pages 115 to 118. According to one process described by Kerr et al, the exhaust gas containing the impurities is first passed through an intermediate container, that is, a variable volume surge tank which is used to remove flow fluctuations and provide a constant feed pressure. The exhaust gas is then passed to a first catalytic reactor in which any free oxygen is reduced and combined with hydrogen at 450° K. to form water. The exhaust gas is then sent to a molecular sieve bed at 75° K. in which all impurities are adsorptively removed and are thus separated out from the exhaust gas. When the capacity of the molecular sieve bed is exhausted, it is heated to 400° K. to desorb the impurities which are then sent to a second catalytic reactor in the form of an oxygen-supplying packed bed operating at 800° K. where the impurities (e.g., ammonia and hydrocarbons) are oxidized into tritium- and/or deuterium-containing water and into tritium- and/or deuterium-free compounds, namely into $CO_2$, $N_2$ and Ar. The tritium- and/or deuterium-containing water then is frozen out at 160° K., and thereafter the frozen water is periodically vaporized. The vapors are fed into a hot uranium metal bed which acts as a getter and which at 750° K. transforms (reduces) the water into D- and/or T-containing hydrogen and stable $UO_2$. In lieu of the reduction by means of the uranium metal bed, Kerr et al state that the reduction can also be carried out with the aid of an electrolytic cell when such a cell becomes available.

Kerr et al also describe a process based on hot uranium metal getters. In this process, the exhaust gas, after leaving the variable volume surge tank, enters a primary uranium bed operating at 1170° K. In this bed, impurities are removed by chemical reactions that form uranium oxides, carbides, and nitrides. The inert argon, with traces of the other impurities, passes through the primary uranium bed and is sent to a molecular sieve bed as in the above-described process. The regenerated argon, with a small amount of tritium, is sent from the molecular sieve bed to a titanium bed, at 500° K., which collects DT and passes on an argon stream containing only tenths of a ppm of DT. Kerr et al state that a disadvantage of this process is that operating temperatures of 1170° K. cause permeation and material problems.

Kerr et al also describe the use of palladium diffusers, and state that they have numerous disadvantages including the need for elevated pressures, reported brittle failures during temperature cycling, reported poisoning by ammonia and methane, and the fact that they can not produce an impurity stream free of hydrogen isotopes.

P. Dinner et al, "Tritium System Concepts for the Next European Torus Project", *Fusion Technology,* Volume 8, No. 2, Part 2, pages 2228–2235, September 1985 (2nd Meeting on Tritium Technol., Dayton, Ohio, 1985) use for the purpose of cleaning the exhaust gas of a fusion reactor a combination of a high-temperature getter and a palladium/silver membrane. The drawback associated with this process and the process of Kerr et al that employ getter beds is that the getter bed must be operated at high temperatures (up to 900° C.). Both material problems and problems resulting from losses due to permeation of tritium may occur during the processes of Kerr et al and Dinner et al. The replacement of the getter bed, which is necessary periodically, gives rise to safety problems due to the fine pyrophoric dust released and the fact that the getter bed must be disposed of as radioactive waste.

Another means of cleaning the exhaust gas of a fusion reactor according to P. Dinner et al, (talk during the 2nd Meeting on Tritium Technol., Dayton, Ohio, 1985) consists in a combination of high-temperature getter, oxygen releasing fixed bed for catalytic oxidation. The associated drawback is that the separated tritium is obtained as water whose radiotoxicity is greater by orders of magnitude compared to gaseous tritium, that the process requires a great number of process steps, and that the oxygen releasing fixed bed has to be operated at 500° C.

At this temperature level there is the danger that the catalyst sinters and becomes ineffective and that an explosion might be caused by an uncontrolled release of oxygen.

In DE-OS 36 06 316 and in DE-OS 36 06 317, processes are described for cleaning the exhaust gas from fusion reactors wherein an oxygen releasing fixed bed, a metal bed as the "getter," and a palladium or palladium-silver membrane are used. DE-OS 36 06 317 further discloses the use of a Ni-catalyst. These processes are subject to the drawbacks which are associated with the operation of the oxygen releasing fixed bed.

SUMMARY OF THE INVENTION

Thus, it is an object of the present invention to provide a simple process comprising few process steps by which the exhaust gas of fusion reactors can be cleaned up.

Another object of the present invention is to provide a process which can be operated at temperatures not much higher than 450° C. and without addition of oxygen, neither by direct oxygen supply nor by use of an oxygen releasing fixed bed.

A further object of the present invention is to provide a process which employs process components that comprise materials not consumed during the process, i.e., which exert a catalyzing effect, so as to keep the operating expenditure and the amount of waste arising in a plant working on this process low.

A still further object of the present invention is to provide a process in which the separated elemental tritium and deuterium are produced in highly pure form because this implies a minimum of radiotoxicity and because in the elemental form they can be recycled into the fusion process.

Additional objects and advantages of the present invention will be set forth in part in the description which follows and in part will be obvious from the description or can be learned by practice of the invention. The objects and advantages are achieved by means of the processes, instrumentalities and combinations particularly pointed out in the appended claims.

To achieve the foregoing objects and in accordance with its purpose, the present invention provides a process for cleaning an exhaust gas from a fusion reactor of exhaust gas components containing heavy hydrogen, the heavy hydrogen components of the exhaust gas being (i) at least one elemental heavy hydrogen isotope selected from deuterium and tritium and (ii) at least one impurities containing the heavy hydrogen isotope deuterium and/or tritium in chemically bound form, the impurities being at least hydrocarbon and water vapor, the exhaust gas further containing carbon monoxide as an impurity, wherein the heavy hydrogen is released from its chemically bound form, and the released heavy hydrogen and the at least one elemental heavy hydrogen isotope are separated from the exhaust gas and returned into the fuel cycle, comprising:

(a) bringing the exhaust gas into a palladium/silver permeator operating at a temperature of less than 450° C. to decompose into its elements any ammonia in the exhaust gas and to separate the exhaust gas into a first stream containing a major fraction of the elemental heavy hydrogen (i) and elemental heavy hydrogen formed by any ammonia decomposition and a residual gas stream containing the impurities, (b) adding carbon monoxide to the residual gas stream if the carbon monoxide/water ratio is less than 1.5 to bring the carbon monoxide/water ratio of the residual gas stream to $\geq 1.5$, (c) reacting the water vapor in the residual gas stream with the carbon monoxide at a carbon monoxide/water ratio of $\geq 1.5$ at 150° to 200° C. on a $CuO/Cr_2O_3/ZnO$ catalyst, to produce quantitatively hydrogen and carbon dioxide, (d) passing the resulting gas stream from step (c) into a palladium/silver permeator containing a nickel-/aluminum oxide-bulk catalyst, or into a nickel catalyst bed followed by a palladium/silver permeator, in order to split up the hydrocarbon into its elements and to separate the hydrogen in its elemental form from the remaining gas to form a decontaminated residual gas stream which does not contain any hydrogen and a hydrogen gas stream which contains elemental hydrogen, and (e) combining the hydrogen gas stream containing elemental hydrogen separated in step (d) with the first stream containing the major fraction of hydrogen separated in step (a).

The decontaminated residual gas stream which does not contain any hydrogen (neither elemental nor bound) can be released into the atmosphere or can be recycled into the $CuO/Cr_2O_3/ZnO$ catalyst in step (c).

It is to be understood that both the foregoing general description and the following detailed description are exemplary and explanatory, but are not restrictive of the invention.

BRIEF DESCRIPTION OF THE DRAWING

The sole drawing FIGURE schematically illustrates one embodiment of an apparatus for performing the process according to the present invention.

DETAILED DESCRIPTION OF THE INVENTION

The exhaust gas from the final cycle of a fusion reactor has approximately the following composition:
80 to 85 Mol% He, Ar
15 to 20 Mol% $NQ_3$, $CQ_4$, $Q_2O$, $Q_2$, CO, $CO_2$, $N_2$ and $O_2$. (Q=H, D, T).

Referring to the drawing, in the present invention, the exhaust gas 2 is brought into a palladium/silver permeator 1 operating at a temperature of 450° C. or below. The small amounts of ammonia which are usually present and expected in the exhaust gas are converted into its elements ($Q_2$ and $N_2$, Q=H, D, T) by a catalytic reaction on the palladium/silver surface of permeator 1. The reaction product hydrogen $Q_2$ from the decomposition of the ammonia and the elemental hydrogen $Q_2$ which is originally present in the exhaust gas selectively penetrate or permeate through permeator 1 where they emerge as the main hydrogen gas process stream 3. Process stream 3 contains a major fraction of the elemental heavy hydrogen originally present in the exhaust gas and of the elemental hydrogen formed by any ammonia decomposition. A major fraction of the light hydrogen isotope H, if present, will also appear in stream 3. The permeator 1 is operated preferably at temperatures between 400° and 450° C. because under these conditions carbon monoxide does not lower the hydrogen permeation rate.

The other gaseous components in the exhaust gas and any nitrogen formed as a result of ammonia decomposition do not permeate through permeator 1 and emerge from permeator 1 as a residual gas stream 4 containing impurities which include water ($Q_2O$), hydrocarbon, $CO_2$ and CO.

After emerging from permeator 1, residual gas stream 4 is brought into contact with a catalyst bed 5 so that the hydrogen isotopes bound in water ($Q_2O$) contained in the residual gas stream 4 are released by reaction with CO in excess according to the reaction equation

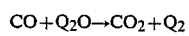

$$CO + Q_2O \rightarrow CO_2 + Q_2$$

Catalyst bed 5 is comprised of a $CuO/Cr_2O_3/ZnO$ catalyst and is at temperatures between 150° and 200° C. The $CuO/Cr_2O_3/ZnO$ catalyst can have a Cu content, as CuO, of 39 wt.%, a Cr content, as $Cr_2O_3$, of 18 wt.%, and a Zn content, as ZnO, of 38 wt.%. In order to achieve 100% reaction of $Q_2O$, a $CO/Q_2O$ ratio of at least 1.5 is required. If the amount of CO in excess is lower than 1.5, CO gas has to be introduced into the gas stream 4 through a CO supply line 6 before gas stream 4 enters catalyst 5 to bring the ratio up to at least 1.5.

At the outlet of the $CuO/Cr_2O_3/ZnO$ catalyst bed 5, the resulting gas stream consists preferably of helium with small amounts of hydrocarbon (methane, ethane and higher aliphatic and aromatic hydrocarbons), nitrogen, carbon monoxide, carbon dioxide, and $Q_2$. In order to release the hydrogen isotopes D and T bound in the hydrocarbons, the gas mixture is passed through a palladium/silver permeator 7 i.e., consisting of a tube array of 2.5. wt.% Ag and 75 wt.% Pd, the tubes containing a nickel/aluminum oxide bulk catalyst at a temperature of 300°–450° C. (Alternatively, the gas mixture can be passed into a nickel catalyst bed followed by a palladium/silver permeator). Here the hydrocarbons are decomposed into their elements by splitting, and the elemental hydrogen $Q_2$ released by the splitting and the hydrogen $Q_2$ that was formed by the reaction of the water vapor in the previous step are separated simultaneously from the remaining gaseous components by selectively permeating through permeator 7. This combination of the splitting reaction and hydrogen permeation allows a high detritiation of the process gas to be achieved.

The hydrogen which is separated in permeator 7 emerges as a hydrogen stream 9 and is combined with the main fraction of hydrogen in stream 3, and the resulting combined stream is transferred to the hydrogen isotope separation system by means of a pump 10. The heavy hydrogen from this separation system can then be fed back into the fuel cycle of the fusion reactor.

The remaining gaseous components in permeator 7 which do not permeate through permeator 7 emerge as a decontaminated residual gas stream 11 which does not contain any hydrogen. Thus, gas stream 11 contains tritium-free and deuterium-free impurities, and can be withdrawn either directly, that is, it can be discharged directly into the atmosphere, or it can be recycled in case cleanup is inadequate. As shown in the drawing, stream 11 can be recycled through a line 12 into the $CuO/Cr_2O_3/ZnO$ catalyst.

In order to counteract a loss in efficiency of the catalyst in permeator 7 due to carbon deposits, the catalyst has to be regenerated periodically using hydrogen or deuterium from a separate source which is fed to permeator 7 from a hydrogen supply 8.

The $CuO/Cr_2O_3/ZnO$ catalyst described in step (c) is known from H. Yoshida et al., Nucl. Technology/Fusion 5, 178 (1984). However, the bound hydrogen in the Yoshida et al process is oxidized to water by addition of oxygen and has to be reduced into water again in another process step so that a complicated process consisting of a number of individual steps results in cleanup of the exhaust gas.

The process according to the present invention, by contrast, comprises only a few process steps.

Decontamination is achieved in the process of the present invention solely by physical or catalytic processes so that a plant working on the process according to the present invention allows the operation to be optimum in terms of availability, waste arisings and safety, especially because the bound hydrogen does not oxidize to become water and the addition of oxygen, be it by direct supply or via an oxygen releasing fixed bed, is avoided.

The present invention is explained in more detail by the following examples.

EXAMPLE 1

In order to study the regeneration capacity of the Ni-catalyst an $He/CH_4$-mixture (330 mbar $CH_4$ and 705 mbar He) was first passed over a catalyst heated to 460° C. in a closed loop (Volume=8.8 liters). The hydrogen released by methane splitting was separated continuously with the help of a Pd/Ag permeator connected to the circuit. Separation of hydrogen causes the equilibrium to shift up to methane concentrations below the detection limit of gas chromatography. Due to the fact that the methane splitting reaction is a reversible one, the carbon deposited on the catalyst can be recovered quantitatively as methane into the gas phase after treatment with hydrogen at temperatures between 450° and 550° C. Without noticeable loss in catalyst efficiency a total of 18 splitting/regeneration cycles were possible on 10 g catalyst. The amount of methane reacted was 2.2 mol (about 0.12 mol/cycle). Under optimized conditions the reaction half-time was about 4.2 minutes.

EXAMPLE 2

In a closed loop (Volume=8.8 liters) $H_2$/He mixtures ($P_{H2}$=200 mbar, total pressure 1 bar) with different carbon monoxide partial pressures ($P_{CO}$=2, 20 and 200 mbar, respectively) were passed through a palladium/silver permeator, heated to 450° C., with an active surface of 289 $cm^2$. The hydrogen permeation constants R were evaluated and were as follows:

R ($P_{CO}$=2 mbar)=(8.26±1.6)×$10^{-7}$ (mol cm/min $cm^2$)

R ($P_{CO}$=20 mbar)=(9.10±0.8)×$10^{-7}$ (mol cm/min $cm^2$)

R ($P_{CO}$=200 mbar)=(7.84±1.4)×$10^{-7}$ (mol cm/min $cm^2$).

These results show that within the error band carbon monoxide concentrations up to 20 mol% have no significant effect on the permeability of the metallic membrane to hydrogen.

EXAMPLE 3

In tests carried out in a closed loop in which a gaseous mixture consisting typically of 2 kPa $H_2O$ and 6 kPa CO diluted in He up to approx. 100 kPa were passed over 5 g of a zinc stabilized copper chromite catalyst ($CuO-ZnO-Cr_2O_3-Al_2O_3$) it was shown that at temperatures between 420 and 520 K. thermodynamic equilibrium can be attained at a sufficiently fast rate. The addition of up to 10 kPa methane to this gaseous mixture influences neither the reaction rate nor the chemical equilibrium.

It will be understood that the above description of the present invention is susceptible to various modifications, changes and adaptations, and the same are intended to be comprehended within the meaning and range of equivalents of the appended claims.

What is claimed is:

1. Process for cleaning an exhaust gas from a fusion reactor of exhaust gas components containing heavy hydrogen, the heavy hydrogen components of the exhaust gas being (i) at last one elemental heavy hydrogen isotope selected from deuterium and tritium and (ii) impurities containing the heavy hydrogen isotope deuterium and/or tritium in chemically bound form, the impurities being at least hydrocarbon and water vapor, the exhaust gas further containing carbon monoxide as an impurity, wherein the heavy hydrogen is released from its chemically bound form, and the released heavy hydrogen and the at least one elemental heavy hydrogen isotope (i) are separated from the exhaust gas and returned into the fuel cycle, comprising:

(a) bringing the exhaust gas into a palladium/silver permeator operating at a temperature below 450° C. to decompose into its elements any ammonia in the exhaust gas and to separate the exhaust gas into a first stream containing a major fraction of the elemental heavy hydrogen (i) and elemental heavy hydrogen formed by any decomposition of ammonia and a residual gas stream containing the impurities, (b) adding carbon monoxide to the residual gas stream if the carbon monoxide/water ratio is less than 1.5 to bring the carbon monoxide/water ratio in the residual gas stream to $\geq 1.5$, (c) reacting the water vapor in the residual gas stream with the carbon monoxide at a carbon monoxide/water ratio of $\geq 1.5$ at 150° to 200° C. on a CuO/Cr$_2$O$_3$/ZnO catalyst to produce quantitatively hydrogen and carbon dioxide, (d) passing the resulting gas stream from step (c) either into a palladium/silver permeator containing a nickel/aluminum oxide-bulk catalyst or into a nickel catalyst bed followed by a palladium/silver permeator in order to split up the hydrocarbon into its elements and to separate the hydrogen in its elemental form from the remaining gas to form a decontaminated residual gas stream which does not contain any hydrogen and a hydrogen gas stream which contains elemental hydrogen, and (e) combining the hydrogen gas stream containing elemental hydrogen separated in step (d) with the first stream containing the major fraction of hydrogen separated in step (a).

2. Process according to claim 1, wherein the decontaminated residual gas stream which does not contain any hydrogen is released into the atmosphere.

3. Process according to claim 1, wherein the decontaminated residual gas stream which does not contain any hydrogen is recycled into the CuO/Cr$_2$O$_3$/ZnO catalyst in step (c).

* * * * *